(12) United States Patent
Walker

(10) Patent No.: US 6,463,823 B2
(45) Date of Patent: Oct. 15, 2002

(54) CONTROL FOR ENGAGING START RATIOS IN CONTROLLER-ASSISTED, MANUALLY SHIFTED, SPLITTER-TYPE COMPOUND TRANSMISSION

(75) Inventor: James M. Walker, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/920,373

(22) Filed: Aug. 1, 2001

(65) Prior Publication Data

US 2002/0032100 A1 Mar. 14, 2002

Related U.S. Application Data

(63) Continuation of application No. 09/416,393, filed on Oct. 12, 1999, now abandoned.

(51) Int. Cl.[7] ............... F16H 59/00; B60K 41/04
(52) U.S. Cl. ............... 74/335; 477/115; 477/908
(58) Field of Search ............... 74/336 R; 1/745; 477/908, 115

(56) References Cited

U.S. PATENT DOCUMENTS

| 4,754,665 | A |   | 7/1988  | Vandervoort       |
|-----------|---|---|---------|-------------------|
| 5,081,588 | A |   | 1/1992  | Holmes et al.     |
| 5,390,561 | A |   | 2/1995  | Stine             |
| 5,436,833 | A |   | 7/1995  | Janecke           |
| 5,651,292 | A |   | 7/1997  | Genise            |
| 5,661,998 | A |   | 9/1997  | Genise            |
| 5,673,592 | A |   | 10/1997 | Huggins et al.    |
| 5,682,790 | A |   | 11/1997 | Genise            |
| 5,704,873 | A |   | 1/1998  | Iwata et al.      |
| 5,713,443 | A |   | 2/1998  | Kronstadt         |
| 5,735,771 | A |   | 4/1998  | Genise            |
| 5,743,143 | A |   | 4/1998  | Carpenter et al.  |
| 5,755,639 | A |   | 5/1998  | Genise et al.     |
| 5,803,869 | A |   | 9/1998  | Jamzadeh et al.   |
| 5,964,121 | A |   | 10/1999 | Steeby et al.     |
| 5,970,810 | A | * | 10/1999 | Wadas ........... 74/336 R X |
| 5,974,906 | A |   | 11/1999 | Stine et al.      |
| 6,044,721 | A |   | 4/2000  | Genise            |
| 6,105,449 | A | * | 8/2000  | Genise et al. ........ 74/335 |
| 6,109,126 | A | * | 8/2000  | Cochran et al. ....... 477/908 X |
| 6,117,046 | A |   | 9/2000  | Ota et al.        |
| 6,128,974 | A | * | 10/2000 | Hughes ........... 74/745 |

* cited by examiner

Primary Examiner—Charles A. Marmor
Assistant Examiner—Roger Pang
(74) Attorney, Agent, or Firm—Kevin M. Hinman

(57) ABSTRACT

A control for shifting into a start ratio in a computer-assisted (48) vehicular splitter-type compound transmission (16) having a main section (16A) shifted by a manually operated shift lever (31) and a controller (42). The splitter section (16E) is provided with a three-position (L, H, N) actuator (46) and is commanded to a splitter-neutral position upon sensing a main section shift to neutral, master clutch (14) disengagement and low vehicle speed (OS<REF<3 MPH) to reduce the inertia of the main shaft assembly and reduce the need for a clutch brake when engaging a start ratio.

2 Claims, 3 Drawing Sheets

CONTROL FOR ENGAGING START RATIOS IN CONTROLLER-ASSISTED, MANUALLY SHIFTED, SPLITTER-TYPE COMPOUND TRANSMISSION

RELATED APPLICATIONS

This application is a continuation of U.S. patent application Ser. No. 09/416,393 filed on Oct. 12, 1999, now abandoned. Benefit of the above cited co-pending U.S. Patent Application is hereby claimed.

This application is related to the following co-pending applications and assigned to EATON CORPORATION, the assignee of this application:

Ser. No. 09/148,873 filed Sep. 8, 1998 and titled CONTROL FOR CONTROLLER-ASSISTED, MANUALLY SHIFTED, SPLITTER-TYPE COMPOUND TRANSMISSION Ser. No. 09/148,882 filed Sep. 8, 1998 and titled CONTROL FOR CONTROLLER-ASSISTED, MANUALLY SHIFTED, SYNCHRONIZED, SPLITTER-TYPE COMPOUND TRANSMISSIONS Ser. No. 09/389,580 filed Sep. 3, 1999 and titled START GEAR ENGAGEMENT CONTROL FOR CONTROLLER-ASSISTED, MANUALLY SHIFTED, SYNCHRONIZED, COMPOUND TRANSMISSION WITH SPLITTER SECTION, now U.S. Pat. No. 6,128,974

BACKGROUND OF THE INVENTION

1. Field of the Invention

The present invention relates to a controller-assisted, manually shifted vehicular transmission system including a splitter-type compound transmission. The system will sense very low vehicle speed, master clutch disengagement, and a shift into main section neutral and will automatically shift the splitter section into neutral, allowing the main section to be engaged into a target start ratio without excess wear on, or the need for, a clutch brake. Upon sensing completion of the main section shift into a target start ratio, the splitter section will be caused to engage in an appropriate splitter ratio.

More particularly, in a preferred embodiment of the present invention, a splitter or combined splitter-and-range-type compound synchronized transmission for heavy-duty vehicles is provided with controls and actuators for manually performed main section start ratio engagement shifting without requiring excessive wear on or the use of a clutch brake.

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404; 5,350,561 and 5,737,696, the disclosures of which are incorporated herein by reference.

Three-position splitter actuators and transmission systems utilizing same are disclosed in U.S. Pat. Nos. 5,651,292 and 5,661,998, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292; 5,679,096; 5,682,790 and 5,735,771; the disclosures of which are incorporated herein by reference.

U.S. Pat. No. 4,527,446, the disclosure of which is incorporated herein by reference, discloses a fully automated, blocked-type transmission wherein the main section is automatically shifted to main section neutral during each shift.

Clutch brakes, also called start brakes, are known in the prior art, as may be seen by reference to U.S. Pat. No. 5,713,443, the disclosure of which is incorporated herein by reference. Clutch brakes are used to retard spinning of the transmission input shaft caused by inertia and/or random clutch engagement when the master clutch is fully disengaged to allow engaging of a start ratio in a stopped or substantially stopped vehicle. In manual systems, actuation of the clutch brake is often by overtravel of the clutch pedal.

The provision, installation, maintenance and/or adjustment of a clutch brake can involve considerable time and expense. The clutch brake can be misused as an upshift brake to allow for more rapid dynamic upshifts, which may result in excessive wear and/or damage to the clutch brake.

SUMMARY OF THE INVENTION

A preferred embodiment of the present invention involves a computer-assisted mechanical compound transmission system wherein the main section is provided with jaw clutches and is shifted by a manually controlled shift lever, and the engine is fueled and/or the auxiliary sections are shifted by actuators at least partially controlled by an ECU to enhance shifting. The ECU uses sensed and/or calculated inputs indicative of system operating parameters, such as vehicle speed, master clutch condition, position and/or rate of change of position of the shift lever, engaged gear ratio, engine speed, output shaft speed and/or throttle pedal position, to assist shifting by controlling the three-position splitter actuator shift actuator and, preferably, also engine fueling and/or operation of the range shift actuator.

In accordance with the present invention, the drawbacks of the prior art are minimized or overcome by the provision of a control method/system that includes logic rules or an algorithm using a number of inputs to determine when the vehicle is at rest, the master clutch is disengaged and the main transmission section is in neutral, and to automatically cause the splitter section to be shifted into splitter section neutral. This will minimize the wear on and/or the need for a clutch brake by reducing the inertia of the rotating elements being clutched by the main section jaw clutches, allowing the main section to be engaged in a start ratio considerably out of synchronous, while not causing an objectionable amount of wear or harshness to the vehicle operator.

By use of the control of the present invention, wear, misuse and damage to the clutch brake can be minimized or the need for a clutch brake eliminated. This will provide savings in initial costs and installation, maintenance and/or adjustment costs.

Accordingly, it is an object of the present invention to provide ECU assistance for enhanced shifting of a mechanical compound splitter-type transmission into a start ratio with minimal or no requirement for a clutch brake.

This and other objects and advantages of the present invention will become apparent from a reading of the following description of the preferred embodiment taken in connection with the attached drawings.

DESCRIPTION OF THE PREFERRED EMBODIMENT

Figure 1:
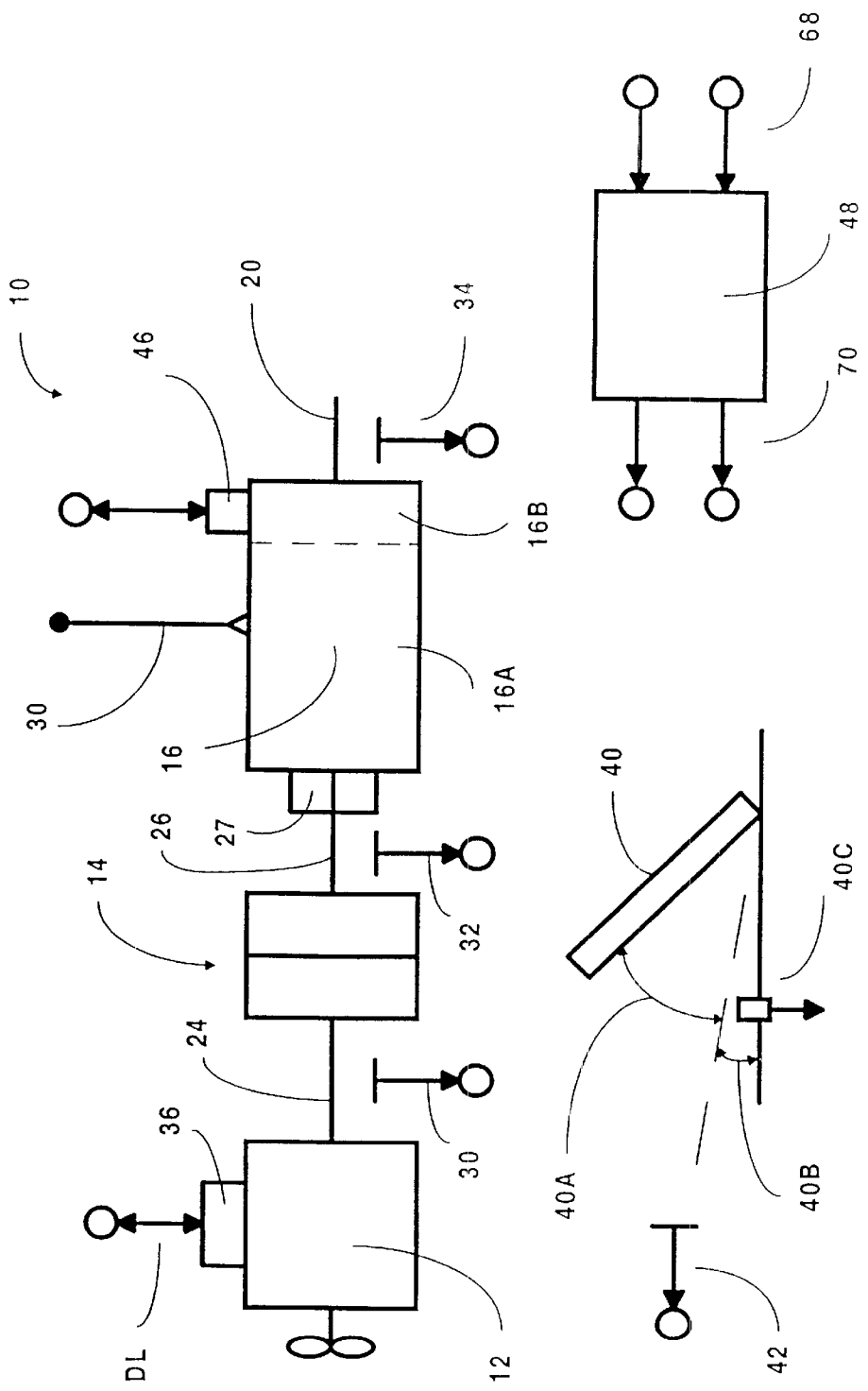
FIG. 1 is a schematic illustration of an ECU-assisted, non-synchronized compound splitter-type mechanical transmission system advantageously utilizing the control techniques of the present invention.
Figure 2:
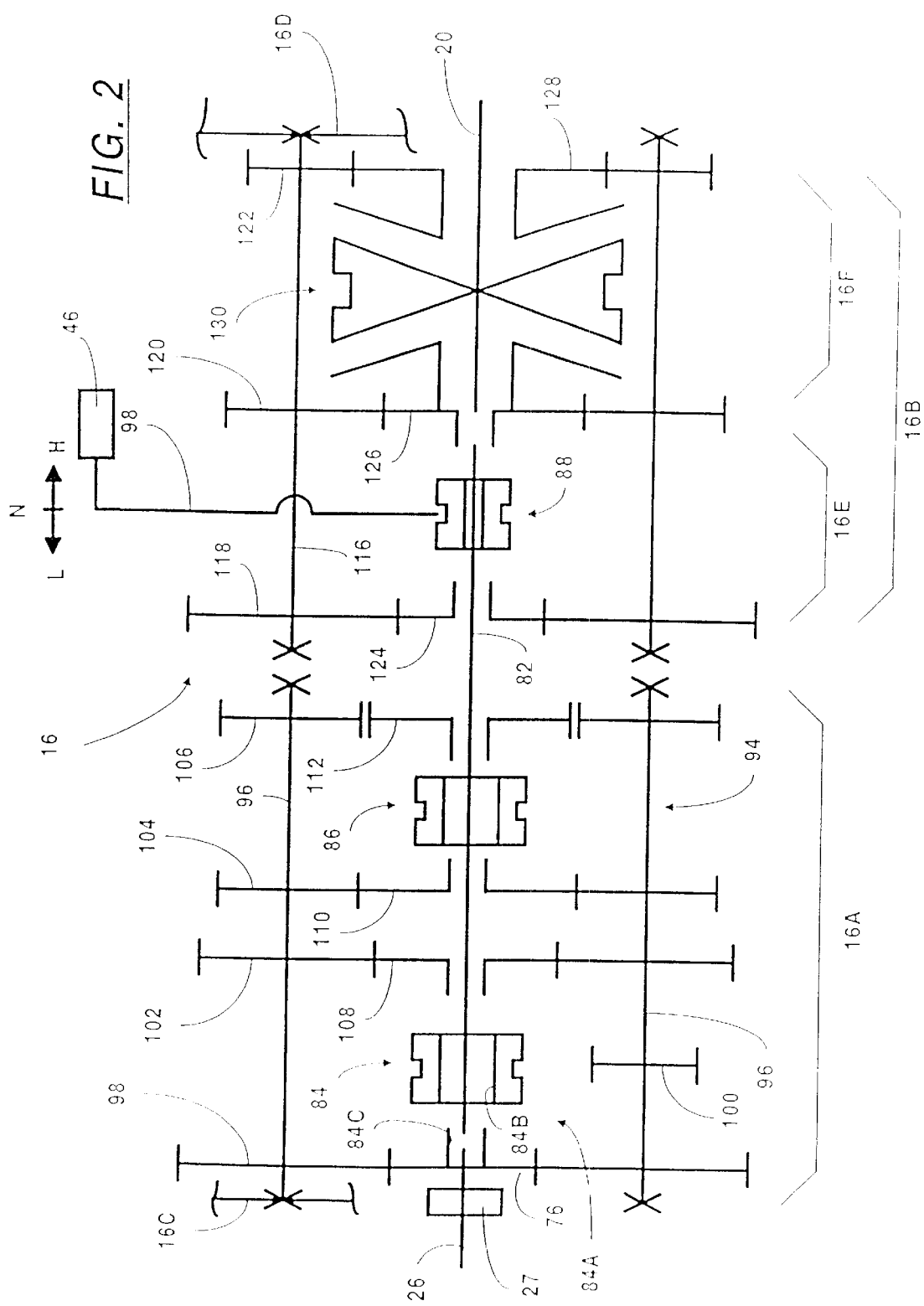
FIG. 2 is a schematic illustration of the structure of the compound mechanical transmission of FIG. 1.

A computer-assisted (i.e., microprocessor-based, controller-assisted) vehicular compound mechanical transmission system 10, particularly well suited to utilize the shift control of the present invention, may be seen by reference to FIGS. 1–2.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft by a universal joint for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

While system 10 is illustrated with a manual shift lever and manual clutch pedal, this is for illustrative purposes only and not intended to be limiting.

Typically, the shift lever assembly 30 will include a shift finger or the like (not shown) extending downwardly into a shifting mechanism, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

Shifting of transmission 16, comprising non-synchronized main section 16A coupled in series to auxiliary section 16B, is semi-automatically implemented/assisted by the vehicular transmission system 10. Main section 16A includes an input shaft 26, which is operatively coupled to the drive or crank shaft 24 of the vehicle engine 12 by master clutch 14, and output shaft 20 of auxiliary section 16B is operatively coupled, commonly by means of a drive shaft, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever according to the shift pattern prescribed to engage the particular desired gear ratio.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor. As is also known, the rotational speed (OS) of the output shaft 20 is indicative of vehicle ground speed.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor (not shown) may be provided or throttle position (THL) may be sensed from the data link. Gross engine torque (TEG) and base engine friction torque (TBEF) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48.

A clutch brake 27 may be used to selectively retard the rotational speed in input shaft 26. Clutch brakes are typically relatively low-capacity friction devices operated automatically or by overtravel of the clutch pedal.

The clutch brake is intended for use during engaging a start ratio with the vehicle at rest.

Clutch pedal 40 has a normal range of travel 40A for engaging and disengaging the normally engaged clutch 14 and an overtravel range 40B by which the driver may select operation of the clutch brake 27. A mechanical switch 40C may be used to sense overtravel of clutch pedal 40.

The system includes a control unit or ECU 48, preferably a microprocessor-based control unit of the type illustrated in U.S. Pat. Nos. 4,595,986; 4,361,056 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or a display. A separate system controller may be utilized, or the engine controller, ECU 36, communicating over an electronic data link, may be utilized.

As shown in aforementioned U.S. Pat. Nos. 5,651,292 and 5,661,998, the splitter actuator 46 is, preferably, a three-position device, allowing a selectable and maintainable splitter-section-neutral. Alternatively, a "pseudo" splitter-neutral may be provided by de-energizing the splitter actuator when the splitter clutch is in an intermediate, non-engaged position.

The structure of the 10-forward-speed combined range-and-splitter-type synchronized transmission 16 is schematically illustrated in FIG. 2. Transmissions of this general type are disclosed in aforementioned U.S. Pat. Nos. 5,000,060; 5,370,013 and 5,390,561.

Transmission 16 includes a non-synchronized main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith. The mainshaft 82 carries synchronized mainshaft clutches 84 and 86, and the mainshaft splitter clutch 88. Shift forks (not shown) are provided for shifting clutches 84 and 86 and are controlled by shift lever 31 acting on the shift assembly 32. Mainshaft 82 is independently rotatable relative to input shaft 26 and output shaft 20 and preferably is free for limited radial movement relative thereto.

As is well known, clutches 84 and 86 are double-acting devices movable fore and aft from the centered positions thereof to engage a selected main section ratio. By way of example, a first jaw clutch 84A is defined by a first array of clutch teeth 84B carried by the leftward end of clutch member 84, which are engageable with a second array of clutch teeth 84C carried by input gear 78.

The main section 16A includes two substantially identical main section countershaft assemblies 94, each comprising a main section countershaft 96 carrying countershaft gears 98, 100, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. Countershaft gear 100 is provided for driving a PTO or the like.

The auxiliary section 16B of transmission 16 includes a splitter section 16E and a range section 16F. Auxiliary section 16B includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Preferably, splitter shifting of transmission 16 is accomplished responsive to initiation by a vehicle operator-actuated splitter button or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561, 325 and 4,663,725.

In a further alternative of the present invention, the shift knob will include a sensor or an intent-to-shift button by which the driver will indicate that he intends to initiate a lever shift sequence. Upon receiving the intent-to-shift signal, the controller will issue commands to the engine controller to relieve torque lock by fuel manipulations and possibly to auxiliary section actuator to preselect the required splitter shift. This will allow easy shifting from the engaged ratio into neutral without operator throttle manipulation or clutch disengagement. Engine manipulations to relieve torque lock without requiring clutch disengagement are described in greater detail in aforementioned U.S. Pat. Nos. 4,850,236 and 5,105,357.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

According to the illustrated embodiment of the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for a 3.6-inch pitch diameter clutch), which will assure that almost any attempted splitter shift under full force will be completed.

The clutch 88 is moved by a shift fork 98 attached to a piston rod of the piston actuator assembly 44. Actuator assembly 44 may be a conventional three-position actuator (see U.S. Pat. No. 5,054,591, the disclosure of which is incorporated herein by reference) or an actuator of the type illustrated in U.S. Pat. No. 5,682,790 or U.S. Pat. No. 5,661,998 (the disclosures of which are incorporated herein by reference), wherein pulse width modulation of a selectively pressurized and exhausted chamber may be used to achieve the three splitter positions (L, N, H) of the shift fork.

Preferably, the splitter clutch actuator 44 will be capable of applying a variable force, such as by pulse width modulation, of supply pressure. A force lesser than full force may be utilized when disengaging and/or when synchronous conditions cannot be verified.

The position of the shift lever or other shifting mechanism controlled thereby may be sensed by a position sensor device. Various positioning sensing assemblies are known in the prior art, with a preferred type illustrated in U.S. Pat. No. 5,743,143, assigned to the assignee of this application, the disclosure of which is incorporated herein by reference.

According to the present invention, when the vehicle is sensed at rest, the master clutch disengaged and the main section in neutral, the splitter section is shifted to and maintained in splitter-neutral. A vehicle at rest condition may be sensed when output shaft speed OS indicates that vehicle speed is less than a value REF no greater than about 3 MPH, preferably about zero MPH. After the main section is engaged in an appropriate start ratio, the splitter section is then engaged in the appropriate splitter ratio.

With the main 16A and splitter 16E sections both in neutral, the main shaft is disconnected from the input shaft 26 and associated gearing (gears 76, 98, 102, 104, 106, 108, 110 and 112) and also from the output shaft 20 and its associated gearing (gears 118, 120, 122, 124, 126 and 128).

If the splitter did not disconnect the main shaft 82 from the vehicle load, the clutches would be exposed to the inertia of the countershafts, the gearing, the input shaft and certain master clutch components. This inertia would be around 0.21 pound-feet/second$^2$, while with the present invention, the inertia of the main shaft, main shaft washers and portions of the synchronizers carried by the main shaft is only about 0.007 pound-feet/second$^2$.

With a relatively low-inertia main shaft, a main section jaw clutch associated with a target start ratio may be engaged considerably out of synchronous without causing undue wear, damage or harshness. Accordingly, the need for a clutch brake 27 is minimized or eliminated.

As is known (see U.S. Pat. No. 5,052,535, the disclosure of which is incorporated herein by reference), allowable relative rotational speed at which the positive clutches will properly engaged (i.e., sufficient clutch tooth penetration will occur) is a directly proportional function of the total effective backlash in the clutch system.

According to the present invention, and as more fully described in U.S. Pat. No. 5,651,292, the disclosure of which is incorporated herein by reference, the interengaging clutch teeth provided on at least clutch 86 and gear 110 may be of a relatively large backlash (i.e., about 0.020–0.060 inches for a 3.6-inch pitch diameter clutch), which will assure that almost any attempted shift will be completed. This will not provide unduly harsh shifts, as, with the main transmission and the splitter sections in neutral, the main shaft 82 is not connected to either the input shaft 26 and associated gearing (gears 76, 98, 102, 104, 106, 108, 110 and 112) or the output shaft 20 and associated gearing (gears 118, 120, 122, 124, 126 and 128).

Upon sensing engagement of the main section in a selected ratio, the controller 48 will cause the splitter section 16E to be engaged in the appropriate splitter ratio. The appropriate ratio may be determined by shaft speeds, sensed shift lever position and/or by signals from a switch which may provide up/down and/or splitter-high/splitter-low shift signals.

The logic rules may beneficially also include rules for determining engine speed, and for causing the splitter section 16 to be shifted into splitter-neutral requiring sensing that engine speed is greater than zero.

Figure 3:
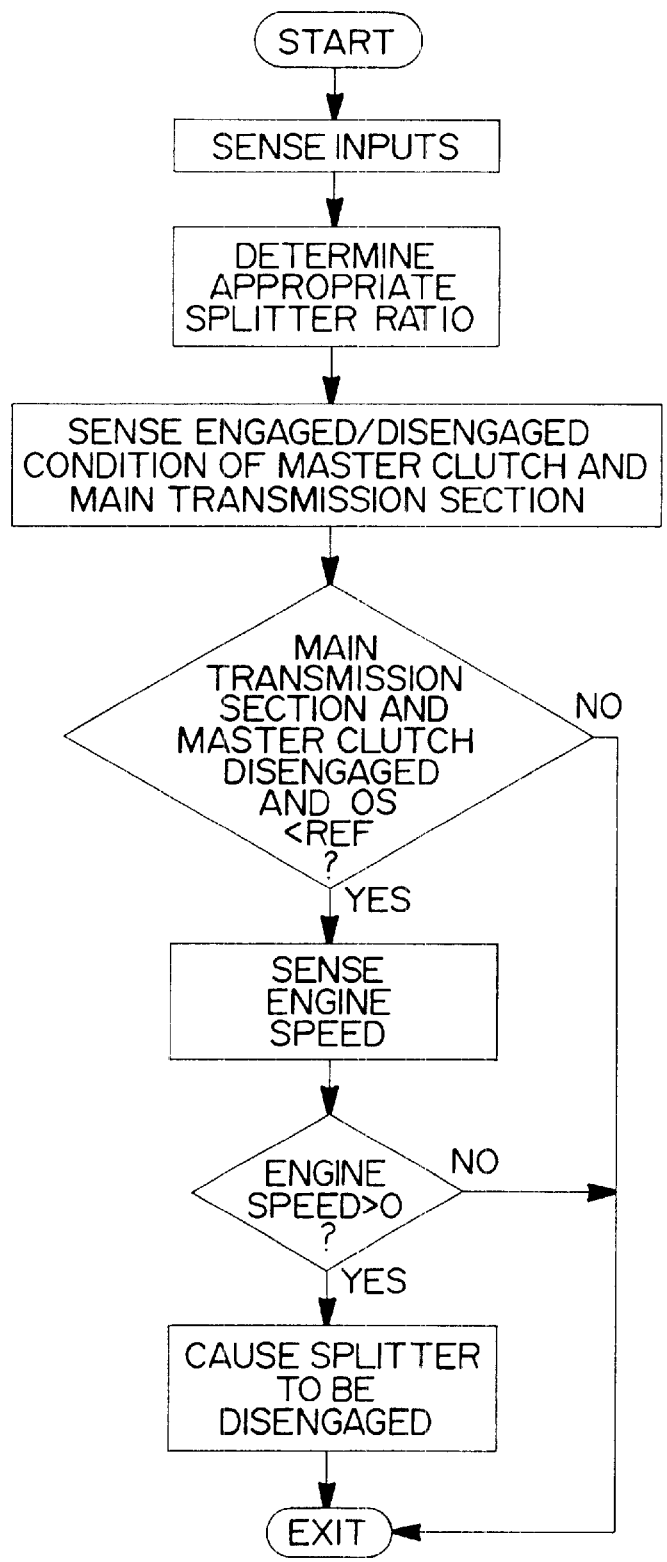
FIG. 3 is a schematic illustration, in flow chart format, of the control of the present invention.

The control of the present invention may be seen in flow chart format by reference to FIG. 3.

Accordingly, it may be seen that a new and improved shift control for an assisted, compound splitter-type mechanical transmission which will reduce or eliminate the necessity for a clutch brake is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A compound vehicular transmission system (10) comprising:

a compound splitter-type mechanical transmission (16) having an input shaft and an output shaft, said input shaft connected to an engine (12) by a master friction clutch (14), said transmission having a main transmission section (16A) connected in series with a splitter-type auxiliary section (16B), said main transmission section defining a plurality of selectable ratios engageable by jaw clutches, said auxiliary transmission section (16E) interposed between said main transmission section (16A) and said output shaft (20);

a splitter actuator (46) for selectively causing said splitter section to be shifted into a selected one of a first splitter ratio, a second splitter ratio, or a splitter-neutral position, and a controller (48, 36) for receiving input signals (68) and processing same according to logic rules to issue command output signals (70) to system actuators including said splitter actuator (46), said logic rules including rules for determining vehicle speed, engaged or disengaged condition of the master clutch, and a shift into a main transmission section ratio and into main transmission section neutral and effective, upon sensing vehicle speed being less than a reference value, said master clutch being disengaged and a shift into main transmission section neutral, to cause said splitter section to be shifted into the splitter-neutral position, and said logic rules also including rules for determining engine speed and causing said splitter section to be shifted into splitter-neutral requiring sensing that engine speed is greater than zero.

2. A method for controlling a compound vehicular transmission system (10) comprising:

a compound splifter-type mechanical transmission (16) having an input shaft and an output shaft, said input shaft connected to an engine (12) by a master friction clutch (14), said transmission having a main transmission section (16A) connected in series with a splitter-type auxiliary section (16B), said main transmission section defining a plurality of selectable ratios engageable by jaw clutches, said auxiliary transmission section (16E) interposed between said main transmission section (16A) and said output shaft (20);

a splitter actuator (46) for selectively causing said splitter section to be shifted into a selected one of a first splitter ratio, a second splitter ratio, or a splitter-neutral position, and a controller (48, 36) for receiving input signals (68) and processing same according to logic rules to issue command output signals (70) to system actuators including said splitter actuator (44), said method comprising the steps of:

sensing vehicle speed, engaged or disengaged condition of the master clutch, and a shift into a main transmission section ratio and into main transmission section neutral;

determining engine speed;

upon sensing vehicle speed being less than a reference value, said master clutch being disengaged and a shift Into main transmission section neutral, and causing said splitter section to be shifted into splitter-neutral only if it is sensed that engine speed is greater than zero.

* * * * *